United States Patent [19]

Heller

[11] Patent Number: 4,897,884
[45] Date of Patent: Jan. 30, 1990

[54] APPARATUS FOR NON-INVASIVE CALIBRATION OF A FLUID SENSOR

[75] Inventor: Herbert Heller, Pittsburgh, Pa.

[73] Assignee: Mine Safety Appliances Company, Pittsburgh, Pa.

[21] Appl. No.: 123,267

[22] Filed: Nov. 20, 1987

[51] Int. Cl.⁴ .............................................. H04B 9/00
[52] U.S. Cl. .............................. 455/603; 340/870.04; 340/870.28; 455/617; 73/1 H
[58] Field of Search ...................... 340/870.04, 870.28, 340/870.31, 870.38; 455/603, 606, 607, 608, 617, 618, 619; 73/1 G, 1 H

[56] References Cited

U.S. PATENT DOCUMENTS

| | | | |
|---|---|---|---|
| 4,322,964 | 5/1982 | Melgaard | 73/1 G |
| 4,476,706 | 10/1984 | Hadden | 73/1 G |
| 4,494,399 | 1/1985 | Youngman | 73/1 G |
| 4,704,607 | 11/1987 | Teather | 73/1 G |
| 4,723,122 | 2/1988 | Maltby | 340/870.04 |
| 4,742,708 | 4/1988 | Porter | 73/1 G |

Primary Examiner—Robert L. Griffin
Assistant Examiner—L. Van Beek
Attorney, Agent, or Firm—Reed Smith Shaw & McClay

[57] ABSTRACT

The present invention pertains to an apparatus for non-invasive calibration of a fluid sensor. The invention includes an electromagnetic signal transmitter and an electromagnetic signal receiver situated remotely from the transmitter. Also, there is a detector circuit electrically connected to the receiver which is capable of recalibrating the sensor according to the signal produced by the receiver when it receives a signal from the transmitter. The transmitter includes a first switch for transmitting an encoded zero up signal, a second switch for transmitting an encoded zero down signal, a third switch for transmitting an encoded span up signal and a fourth switch for transmitting an encoded span down signal. The decoder is capable of producing the same signals, respectively. The decoder also has output ports for these respective signals. Futhermore, the detector circuit has similar input ports which are electrically connected to the corresponding output ports of the decoder.

6 Claims, 2 Drawing Sheets

APPARATUS FOR NON-INVASIVE CALIBRATION OF A FLUID SENSOR

FIELD OF THE INVENTION

The present invention relates to the calibration of a fluid sensor. More specifically, the present invention relates to non-invasive calibration of a fluid sensor using infrared radiation.

BACKGROUND OF THE INVENTION

Sensors are commonly used to determine whether there is present a predetermined fluid. For instance, sensors are used to determine if hazardous or explosive fluids are present and in what amounts it is present. In such circumstances, it is desired for the sensor and its circuitry to be placed in a protective housing so the dangerous fluid cannot enter and allow propagation of explosion or flame throughout the area.

In order for sensors to be of use their calibration must be correct. If a sensor's calibration is not accurate then it may indicate the presence of a fluid when there is none or the wrong amount of a fluid that could result in an incorrect response by those relying on the readings from the sensor.

For utmost protection and safety it is ideal for a sensor to be calibrated by remote control. There is then no need to remove the protective housing around the sensor and consequently safety is maintained.

There are currently available remote control devices. U.S. Pat. No. 4,156,134 to Minner teaches a remote control device for operation by means of radiation. The devices includes a receiver for the radiation which has means for transforming the radiation into an electric signal and rectification means for rectifying the electronic signal. U.S. Pat. No. 3,289,001 to Wilcox teaches a system for actuating remote electrical circuits with a beam of electromagnetic radiation. U.S. Pat. No. 2,362,832 to Lard teaches a remote control apparatus employing polarized radiation. U.S. Pat. No. 2,903,575 to Palley teaches a remote control system for a wavesignal receiver that is controllable by a light source. U.S. Pat. No. 2,955,777 to Null, et al. discloses an infrared television detector and controller for airborne missiles. However, none of the above teaches a remote control apparatus for calibration of a sensor.

Rexnord gas detection division, Sunnyvale, Calif., does teach two-way communication between a transmitter and calibration meter of a sensor but appears to require a close, exact coupling between components. The calibration indication is outputted to the transmitter. The Rexnord system requires two-way communication therebetween.

SUMMARY OF THE INVENTION

The present invention pertains to an apparatus for non-invasive calibration of a fluid sensor. The invention comprises means for transmitting an electromagnetic signal and means for receiving the electromagnetic signal from the transmitting means and producing a signal corresponding to the electromagnetic signal received. The receiving means is situated remotely from the transmitting means. Also, there is a detector circuit electrically connected to the receiving means which is capable of recalibrating the sensor according to the signal produced by the receiving means.

In a preferred embodiment the transmitting means includes an infrared radiation transmitter which is an encoder and the receiving means is an infrared radiation receiver which is a decoder.

In an even more preferred embodiment the encoder includes first switch means for transmitting an encoded zero up signal, second switch means for transmitting an encoded zero down signal, third switch means for transmitting an encoded span up signal and fourth switch means for transmitting an encoded span down signal. The decoder is capable of producing a zero up signal, a zero down signal, a span up signal or a span down signal when an encoded zero up signal, an encoded zero down signal, an encoded span up signal or an encoded span down signal, respectively, is received by the decoder. The decoder also has a zero up output port, a zero down output port, a span up output port and a span down output port through which the zero up signal, the zero down signal, the span up signal and the span down signal, respectively, are able to pass out of the decoder. Furthermore, the detector circuit has a zero up input port, a zero down input port, a span up input port and a span down input port which are electrically connected to the zero up output port, the zero down output port, the span up output port and the span down output port, respectively, of the decoder.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
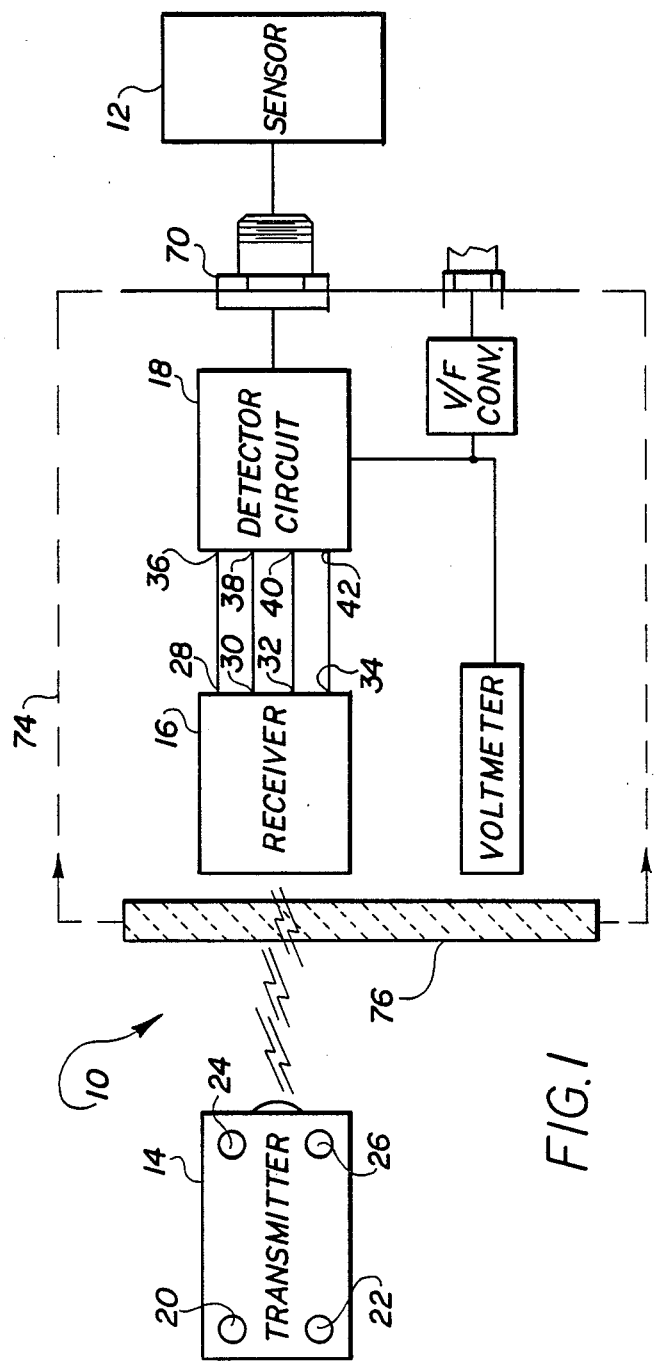
FIG. 1 is a schematic diagram of the apparatus for non-invasive calibration of a fluid sensor.

Referring now to the drawings, wherein like reference numerals designate identical or corresponding parts throughout the several views, and more particularly to FIG. 1 thereof, there is shown an apparatus 10 for non-invasive calibration of a fluid sensor 12. The apparatus 10 comprises means 14 for transmitting an electromagnetic signal and means 16 for receiving the electromagnetic signal from the transmitting means 14 and producing a signal corresponding to the electromagnetic signal received. The receiving means 16 is situated remotely from the transmitting means 14. Also, there is a detector circuit 18 electrically connected to the receiving means 16 which is capable of recalibrating the sensor 12 according to the signal produced by the receiving means 16.

The transmitting means 10 can, for instance, be an infrared radiation transmitter 14. Preferably, the infrared radiation transmitter 14 is an encoder 14. The encoder 14 includes first switch means 20 for transmitting an encoded zero up signal, second switch means 22 for transmitting an encoded zero down signal, third switch means 24 for transmitting an encoded span up signal and fourth switch means 26 for transmitting an encoded span down signal. See Motorola CMOS/NMOS Special Functions Data Book, DL130, 1984, pages 7-27–7-33 for an example of an infrared radiation encoder which can be used in the present invention.

The receiving means 16 can, for example, be an infrared radiation receiver 16 and is preferably an infrared radiation decoder 16. The decoder 16 is capable of producing a zero up signal, a zero down signal, a span up signal or a span down signal when an encoded zero up signal, an encoded zero down signal, an encoded span up signal or an encoded span down signal, respectively, is received by the decoder 16. Preferably, the decoder 16 has a zero up output port 28, a zero down output port 32 and a span down output port 34 through which the zero up signal, the zero down signal, the span up signal, and the span down signal, respectively, are able to pass out of the decoder 16. See Motorola CMOS/NMOS Special Functions Data Book. DL130. 1984, pages 7-27-7-33 for an example of an infrared radiation decoder which can be used in the present invention.

The decoder 16, the sensor 12 and the detector circuit 18 are enclosed by a housing 74. The housing 74 preferably includes a window 76 that is transparent to infrared radiation. The window 76 is disposed to allow infrared radiation passing through the window 76 to communicate with the decoder 16.

The detector circuit 18 can, for instance, have a zero up input port 36, a zero down input port 38, a span up input port 40 and a span down input port 42 which are electrically connected to the zero up output port 28, the zero down output port 30, the span up output port 32 and the span down output port 34, respectively, of the decoder 16. The detector circuit 18 preferably includes a first potentiometer 44 electrically connected to the zero up input port 36 and the zero down input port 38. The first potentiometer 44 is capable of having a voltage thereacross. The first potentiometer 44 also has a resistance which is increased when a zero up signal is received by the decoder 16 and which is decreased when a zero down signal is received by the decoder 16 as is well known. The first potentiometer 44 is capable of producing a third signal corresponding to the resistance of the first potentiometer 44 and the voltage thereacross. See for instance the XICOR, INC. X9MME potentiometer product sheet for an example of an applicable potentiometer to be used herein.

The detector circuit 18 also includes a first sensor input port 46 for receiving a first signal from the sensor 12, and a second sensor input port 48 for receiving a second signal from the sensor 12. Preferably, the sensor 12 is in the form of a wheatstone bridge having a reference signal and a bridging signal. The reference signal from a sensor having the form of a wheatstone bridge typically originates from a location 50 which is between a compensation sensor 52 and a detection sensor 54 and has a voltage which is essentially half the voltage difference across the sensor 12. The bridging signal typically originates from a location 56 which is between the first resistance leg 58 and the second resistance leg 60 of the wheatstone bridge and has a voltage corresponding to the fluid under analysis in the sensor 12. See REF Data for Radio Engine, H. W. Sams, ITT Sixth Ed., pp. 12-1 for an example of a sensor in the form of a wheatstone bridge. When an embodiment of the present invention uses a sensor 12 in the form of a wheatstone bridge, the first signal from the sensor 12 is the bridging signal which is received by the detector circuit 18 through the first sensor input port 46. Similarly, the second signal is the reference signal which is received by the detector circuit 18 through the second sensor input port 48.

Furthermore, an adder circuit 62 is electrically connected to the first sensor input port 46 and to the first potentiometer 44. The adder circuit 62 is capable of producing a fourth signal that corresponds to the sum of the first signal from the first sensor input port 46 and the third signal from the first potentiometer 44. The fourth signal produced by the adder circuit is preferably an addition of the first signal and the third signal. See REF Data For Radio Engineers, pp. 21-30, FIG. G for an example of an adder circuit 62.

An operational amplifier 64 is electrically connected to the second sensor input port 48 and forms part of the adder circuit 62. The operational amplifier 64 is capable of producing the fourth signal corresponding to the algebraic sum of the first signal from the first potentiometer 44 and the third signal from the first sensor port 46, with reference to the second signal from the second sensor input port 48. The difference between the first and third signals with respect to the second signal corresponds to the amount of fluid under analysis in the sensor 12. See REF Data, pp. 21-28; 21-29 for an example of an operational amplifier 64.

In addition, a second potentiometer 66 is electrically connected to the span up input port 40 and the span down input port 42, and is also electrically connected to the operational amplifier 64. The second potentiometer is capable of having a voltage thereacross corresponding to the fourth signal from the operational amplifier 64. The second potentiometer 66 has a resistance which is increased when a span up signal is received by the decoder 16, and decreased when a span down signal is received by the decoder 16. The second potentiometer 66 is capable of producing a fifth signal corresponding to the resistance of the second potentiometer 66 and the voltage thereacross.

Moreover, a variable resistor 68 is electrically connected in parallel with the second potentiometer 66. The variable resistor 68 is capable of producing an sixth signal corresponding to the fifth signal from the second potentiometer 66 and the resistance of the variable resistor 68. Also, the detector circuit 18 can include a sensor output port 70 electrically connected to the operational amplifier 64 and the variable resistor 68 for allowing the respective signals therefrom to pass therethrough. Preferably, the apparatus 20 includes a display 72 which is electrically connected to the sensor output port 70 for displaying the calibration of the sensor.

In the operation of the invention a zero fluid is first provided to the sensor 12. A zero fluid is a fluid that has no reactants which are detectable by the sensor. The apparatus 10 produces a signal which corresponds to the zero fluid therein and that signal is displayed in the display 72. If the zero reading is not zero when zero gas is present in the sensor 12, then, depending on whether the reading is too high or too low, the reading is changed to the desired value.

If the reading is too high, the zero down switching means 22 is activated. An encoded zero down signal is then transmitted to the decoder 16. The decoder 16 decodes the received zero down signal. The decoder 16 produces a zero down output signal that travels out of zero down output port 30 to the detector circuit 18. At the detector circuit 18, the zero down input port 38 receives the signal. Specifically, the first potentiometer 44 receives the zero down signal which causes the resistance of the first potentiometer 44 to increase. The first potentiometer produces a third signal corresponding to the voltage maintained across the first potentiometer and the resistance the first potentiometer possesses. The resistance keeps increasing as long as the zero down signal is received. When the zero down signal from the transmitter 14 stops, then the resistance of the first potentiometer 44 is maintained at the resistance value that was present when the zero down signal stopped. The third signal from the first potentiometer is continuous and is supplied to an adder circuit 62.

The operational amplifier 64 of the adder circuit 62 also receives a first signal from the sensor 12 through the first sensor input port 46. The first signal from the sensor 12 corresponds to the signal from the sensor with the zero gas present therein. The adder circuit 62 takes the first signal from the sensor 12 and the third signal from the potentiometer 44 and adds them together. Since the third signal from the potentiometer 44 corresponds to a zero down signal, the fourth signal from the adder circuit 62 corresponds to a lower zero calibration of the sensor.

A second signal from the sensor 12, the reference signal thereof, is also provided to the operational amplifier 64 of the adder circuit 64 through the second sensor input port 48. The operational amplifier 64 produces the fourth signal that corresponds to the algebraic sum of the first and third signals with regard to the second signal, or reference signal, from the sensor 12. The fourth signal is received by the display 72 and shows the calibration when there is zero fluid present in the sensor 12.

The fourth signal from the operational amplifier 64 also is provided to a second potentiometer 66. The fourth signal defines the voltage that is present across the second potentiometer 66. Since the fourth signal from the operational amplifier 64 corresponds to the zero calibration of the sensor 12, the voltage across the second potentiometer 66 includes any compensation in the zero calibration of the sensor.

If the zero calibration is desired to be increased, the zero up switching means 20 is activated, and the above description provided for the zero down signal is applicable. A difference exists through the adder circuit 62 where the first signal from the sensor 12 increases in value due to the adder circuit 62 adding the third signal to it.

Once the desired zero calibration is achieved, the zero gas is removed from the sensor 12 and a span fluid is provided to the sensor 12. A span fluid is a fluid with a known percentage of reactants. Depending on whether the calibration of the sensor 12 when span fluid is present is too high or too low, the span up or span down switch means 24, 26 can be used to modify the span calibration.

If the span calibration is too high, the span down switch means 26 is actuated producing an encoded span down signal. The encoded span down signal is received by the decoder 16 which decodes the encoded span down signal and produces a span down signal that is outputted through span down output port 34. The span down signal passes from the decoder span down output port 34 into the span down input port 42 of the detector circuit 18.

Specifically, the span down signal received by the detector circuit 18 through the span down input port 42 is provided to the second potentiometer 66. The span down signal causes the resistance of the second potentiometer 66 to decrease. The second potentiometer 66 produces a fifth signal that corresponds to the voltage across the second potentiometer, which is determined by the fourth signal from the amplifier 64, and the resistance across the second potentiometer 66. The fourth signal from the operational amplifier 64 corresponds to the span fluid present in the detector 12. The fifth signal produced by the second potentiometer 66 passes through variable resistor 68. Since the resistance of the second potentiometer 66 and the resistance of the variable resistor 68 are in parallel, the lower resistance of the second potentiometer results in a lower span calibration. The value of the calibration when the span gas is present in the sensor 12 is passed from the variable resistor 68 to the display 72.

If the span calibration is desired to be increased, the span up switching means 24 is activated. The same description as provided for the operation of the invention when a span down signal is present therein is applicable, except that the resistance of the second potentiometer 66 decreases. The decrease in resistance of the second potentiometer 66, which is in parallel with the variable resistor 68 results in an increase in the span calibration.

Figure 2:
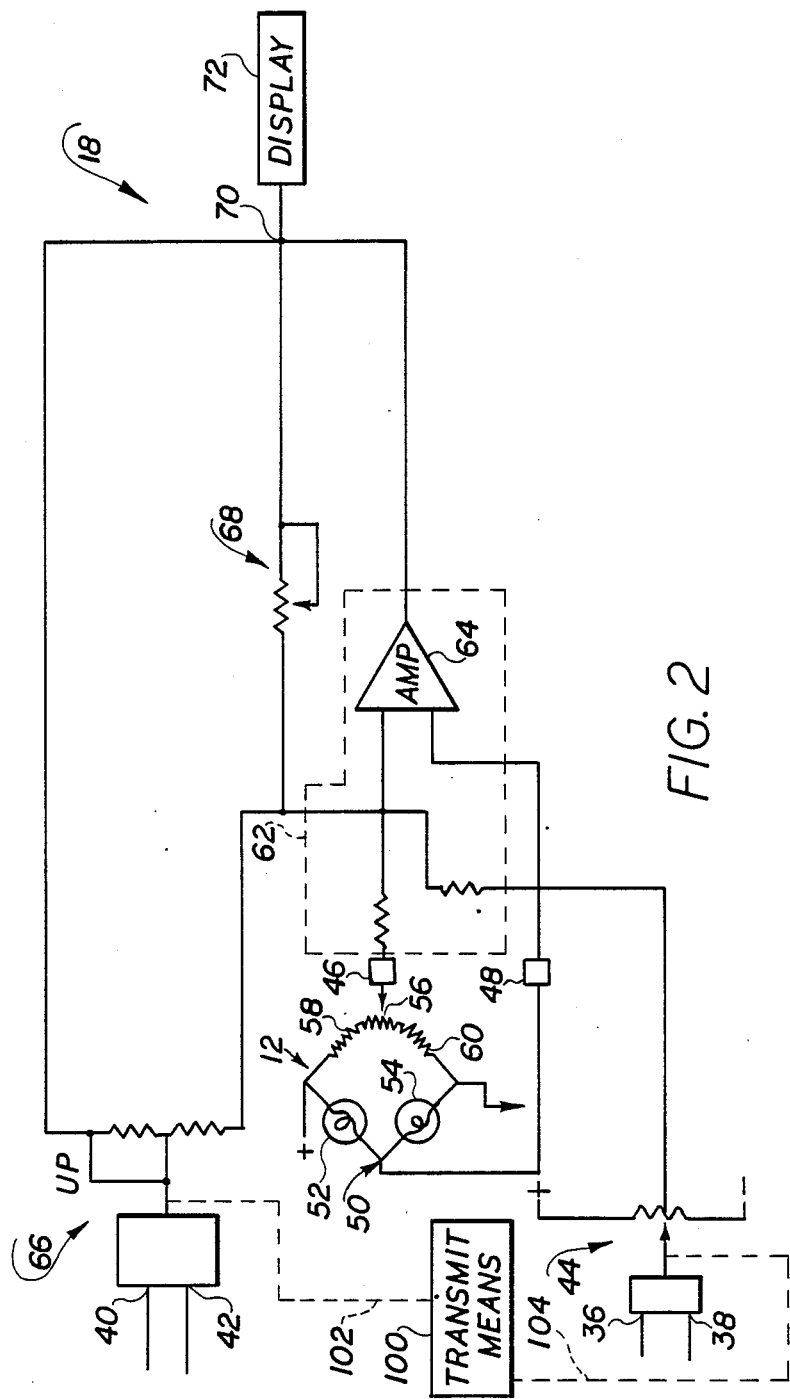
FIG. 2 is a schematic diagram of a detector circuit with regard to the apparatus for non-invasive calibration of a fluid sensor.

In an alternative embodiment, instead of an electromagnetic transmitting means 14 supplying the encoded signals, which are decoded by the receiving means 16 and consequently change the calibration of the system, a first and second wire 102, 104 (dotted lines) electrically connected to the first and second potentiometers can be used to provide respective decoded signals directly thereto. Then, simply a transmitting means 100, see FIG. 2, for transmitting decoded signal along the wires can be used to calibrate the system. The remainder of the detector circuit operates as described above.

Although the invention has been described in detail in the foregoing for the purpose of illustration, it is to be understood that such detail is solely for that purpose and that variations can be made therein by those skilled in the art without departing from the spirit and scope of the invention as described by the following claims.

I claim:

1. An apparatus for non-invasive calibration of a fluid sensor comprising: a means for transmitting an electromagnetic signal including an infrared radiation transmitter acting as an encoder and a means for receiving the electromagnetic signal from the transmitting means including an infrared radiation receiver acting as a decoder, the receiving means being situated remotely from the transmitting means and producing a signal corresponding to the electromagnetic signal received; and a detector circuit electrically connected to the receiving means which is capable of recalibrating the sensor according to the signal produced by the receiving means;

wherein the encoder includes a first switch means for transmitting an encoded zero up signal, a second switch means for transmitting an encoded zero down signal, a third switch means for transmitting an encoded span up signal and a fourth switch means for transmitting an encoded span down signal;

wherein the decoder is capable of producing a zero up signal, a zero down signal, a span up signal or a span down signal when an encoded zero up signal, an encoded zero down signal, an encoded span up signal or an encoded span down signal, respectively, is received by the decoder;

wherein the decoder has a zero up output port, a zero down output port, a span up output port and a span down output port through which the zero up signal, the zero down signal, the span up signal and the span down signal, respectively, are able to pass out of the decoder; and wherein the detector circuit has a zero up input port, a zero down input port, a span up input port and a span down input port which are electrically connected to the zero up output port, the zero down output port, the span up output port and the span down output port, respectively, of the decoder.

2. An apparatus as described in claim 1 wherein the detector circuit includes a first potentiometer electrically connected to the zero up input port and the zero down input port, said first potentiometer capable of having a voltage thereacross said first potentiometer having a resistance which is increased when a zero up signal is received by the decoder and which is decreased when a zero down signal is received by the decoder, said first potentiometer capable of producing a third signal corresponding to the resistance of the first potentiometer and the voltage thereacross;

a first sensor input port for receiving a first signal from the sensor;

a second sensor input port for receiving a second signal from the sensor;

an adder circuit having an operational amplifier with a first input being electrically connected through separate resistors to the first sensor input port and the first potentiometer, and with a second input being electrically connected to the second sensor input port, said adder circuit capable of producing a fourth signal at the output of the operational amplifier that corresponds to the sum of the first signal from the first sensor input port and the third signal from the first potentiometer, with respect to the second signal from the second sensor input port;

a second potentiometer electrically connected to the span up input port and the span down input port, and also electrically connected to the first input of the operational amplifier, said second potentiometer capable of having a voltage thereacross corresponding to the fourth signal from the operational amplifier, said second potentiometer having a resistance which is increased when a span up signal is received by the decoder, and decreased when a span down signal is received by the decoder, said second potentiometer capable of producing a fifth signal corresponding to the resistance of the second potentiometer and the voltage thereacross;

a variable resistor electrically connected in parallel with the second potentiometer, said variable resistor capable of producing a sixth signal corresponding to the fifth signal from the second potentiometer and the resistance of the variable resistor and a sensor output port electrically connected to the operational amplifier and the variable resistor for allowing the respective signals therefrom to pass therethrough.

3. An apparatus as described in claim 2 including a display electrically connected to the sensor output port for displaying the calibration of the sensor.

4. An apparatus as described in claim 3 including a housing enclosing the decoder, the sensor and the detector circuit which has a window transparent to infrared radiation that is disposed to allow infrared radiation passing through the window to communicate with the decoder.

5. An apparatus as described in claim 4 wherein the sensor is in the form of a wheatstone bridge having a reference signal and a bridging signal, and wherein the first signal is the bridging signal and the second signal is the reference signal.

6. An apparatus for non-invasive calibration of a fluid sensor comprising:

means for transmitting a decoded signal;

a first and second wire;

a first potentiometer electrically connected to the first wire, said first potentiometer capable of having a voltage thereacross, said first potentiometer having a resistance which is increased when a zero up signal is received and which is decreased when a zero down signal is received, said first potentiometer capable of producing a third signal corresponding to the resistance of the first potentiometer and the voltage thereacross;

a first sensor input port for receiving a first signal from the sensor electrically connected to the means for transmitting the decoded signal;

a second signal input port for receiving a second signal from the sensor;

an adder circuit having an operational amplifier with a first input being electrically connected through separate resistors to the first sensor input port and the first potentiometer and with a second input being electrically connected to the second sensor input port, said adder circuit capable of producing a fourth signal at the output of the operational amplifier that corresponds to the sum of the first signal from the first sensor input port and the third signal from the first potentiometer, with respect to the second signal from the second sensor input port;

a second potentiometer electrically connected to the second wire, and also electrically connected to the first input of the operational amplifier, said second potentiometer capable of having a voltage thereacross corresponding to the fourth signal from the operational amplifier, said second potentiometer having a resistance which is increased when a span up signal is received by the decoder, and decreased when a span down signal is received said second potentiometer capable of producing a fifth signal corresponding to the resistance of the second potentiometer and the voltage thereacross;

a variable resistor electrically connected in parallel with the second potentiometer, said variable resistor capable of producing a sixth signal corresponding to the fifth signal from the second potentiometer and the resistance of the variable resistor; and a sensor output port electrically connected to the operational amplifier and the variable resistor for allowing the respective signals therefrom to pass therethrough.

* * * * *